No. 740,519.

Patented October 6, 1903.

UNITED STATES PATENT OFFICE.

FRIDA BRANDNER, OF BROOKLYN, NEW YORK.

PROCESS OF PRODUCING BEVERAGES.

SPECIFICATION forming part of Letters Patent No. 740,519, dated October 6, 1903.

Application filed February 5, 1903. Serial No. 142,090. (No specimens.)

*To all whom it may concern:*

Be it known that I, FRIDA BRANDNER, residing in the borough of Brooklyn, in the county of Kings and State of New York, have invented certain new and useful Improvements in Processes of Producing Beverages, of which the following is a full, clear, and exact description, such as will enable others skilled in the art to which it appertains to make and use the same.

This invention relates to a process for producing a new and agreeable beverage; and it consists in the process which in its essential and supplemental steps will be fully set forth hereinafter.

The process consists in general in mixing coarsely-ground coffee or the essence of coffee with an alcoholic liquor, allowing the mixture to stand for a period, stirring it at intervals during such period, and then allowing it to stand for a further period until it is in condition for consumption or for bottling.

One of the ingredients used is coffee. This coffee is preferably first roasted in alcohol. This may be advantageously done by spraying the coffee-beans with alcohol and exposing them to the action of heat. The coffee is then ground into small pieces until it is in what might be called a "coarsely-ground" or "comminuted" state. It is preferred that it should not be pulverized. In place of such prepared coffee the essence of coffee may be used, if desired. With this coffee is mixed a liquor, which may be brandy, cognac, rum-spirits, French alcohol, whisky, wine, or other alcoholic liquor. The mixture is then allowed to stand for a period. During this period it is stirred or otherwise agitated at intervals and is then allowed to stand for a further period without stirring. It has been found that the process is efficiently carried out if the first period is for about two days, it being stirred five times each day at intervals of two hours and allowed to stand or remain undisturbed for the remaining time. The mixture is preferably kept during this time in a closed vessel, although it should not be hermetically closed to prevent the access of air thereto, as the action of the air upon the mixture is under some circumstances advantageous. The main object to be attained, however, is the thorough impregnation and intermixture of the extract of coffee with the liquor. In common parlance the coffee should be thoroughly "soaked" into the liquor. As a next step in the process water and sugar may be added, the sugar preferably being in what is known as a "raw" state. These ingredients are thoroughly mixed in with the liquor and coffee, and the mixture is again allowed to stand for a period, which may, preferably, be about two days. It is then filtered and drawn off for consumption or bottling.

If liquor and coffee only are used without the addition of the other ingredients, the process would otherwise remain the same—that is, the final period of rest would be the same as if the sugar and water, one or both, had been added.

I do not claim the product produced by this process, as said product is claimed as such in a companion application of even date with this application.

Suitable proportions for the ingredients for making one gallon of the beverage have been proved to be six pints and one gill of the liquor of alcohol, one and one-half pints of water, eight ounces of raw sugar, and twelve ounces of coffee. These proportions are not obligatory, but may be varied within wide limits—as, for example, it has been found that the use of seven and one-half pints of alcoholic liquor with twenty ounces of coffee produces an agreeable beverage.

It will be obvious that many changes in proportions, timing of various steps, and ways of carrying out various steps may be varied without departing from this invention.

I claim—

1. The process for producing a beverage which consists in mixing ground coffee with an alcoholic liquor, allowing the mixture to stand for a period of about two days, stirring or agitating the mixture at intervals during such period, adding water, allowing the mixture to remain undisturbed for a further period of about two days, and thereupon filtering the mixture.

2. The process for producing a beverage which consists in preparing coffee by grinding, mixing said ground coffee with alcoholic liquor, allowing the mixture to stand for a period, stirring the mixture at intervals during such period, thereupon adding sugar and water, allowing the mixture to remain undisturbed for a period, and filtering the mixture.

3. The process for producing a beverage which consists in spraying or coating coffee-beans with alcohol, roasting said sprayed beans, grinding the roasted beans, mixing the ground coffee with an alcoholic liquor, allowing the mixture to stand for a period until the coffee has been thoroughly soaked into the liquor, adding sugar and water, allowing the mixture to stand for a further period, and thereupon filtering the mixture.

In testimony whereof I affix my signature in the presence of two witnesses.

FRIDA BRANDNER.

Witnesses:
CORNELIUS SEIBERT,
JOHN BRANDNER.